Sept. 10, 1935. W. ERNST Re. 19,694

HYDRAULIC MOTOR CONTROL MEANS

Original Filed Sept. 15, 1930 3 Sheets-Sheet 1

Sept. 10, 1935. W. ERNST Re. 19,694

HYDRAULIC MOTOR CONTROL MEANS

Original Filed Sept. 15, 1930 3 Sheets-Sheet 2

Inventor,
Walter Ernst,
By Baldwin & Wight
Attorneys.

Sept. 10, 1935. W. ERNST Re. 19,694
HYDRAULIC MOTOR CONTROL MEANS
Original Filed Sept. 15, 1930 3 Sheets-Sheet 3
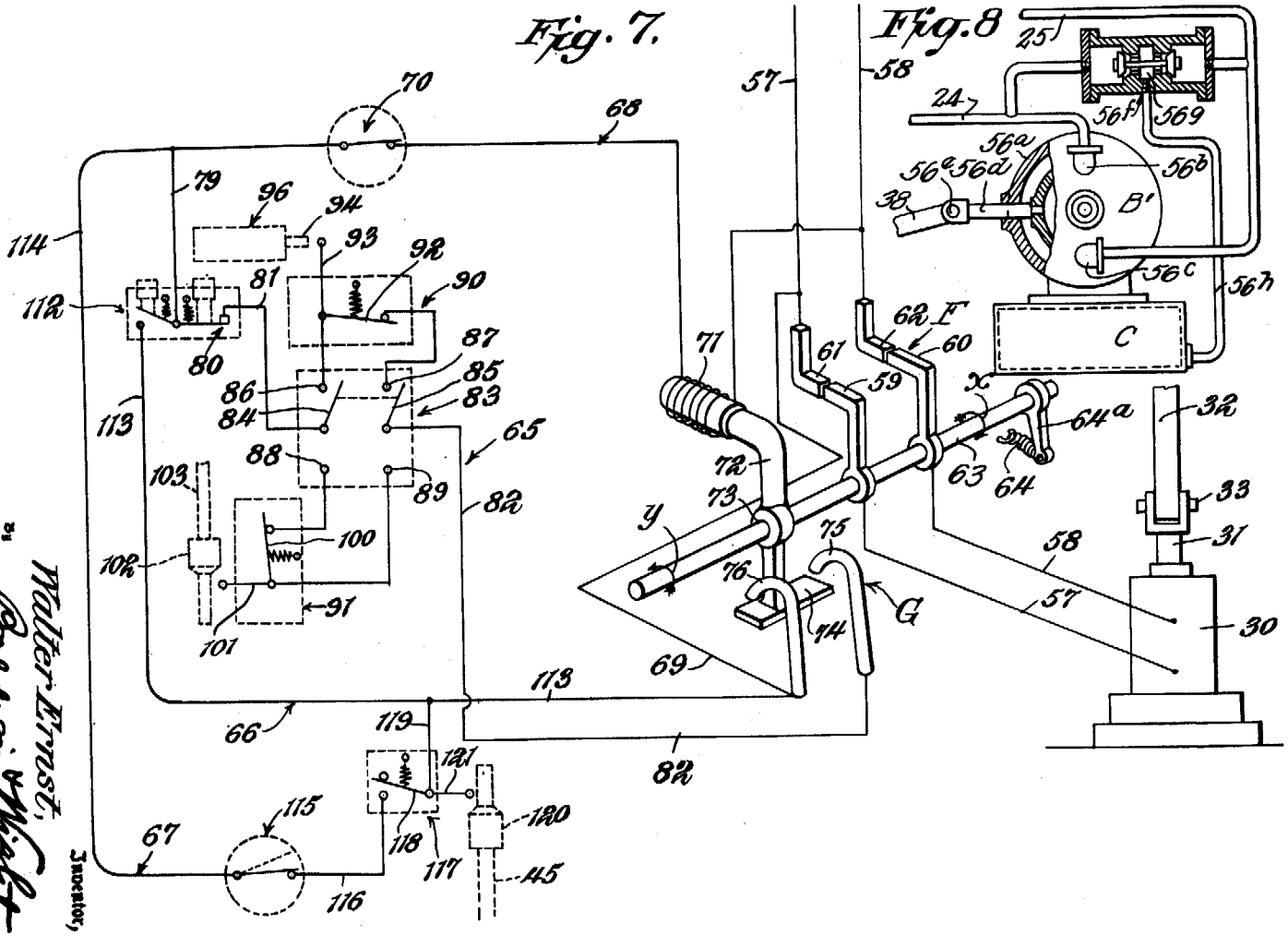
Inventor,
Walter Ernst,
By Baldwin & Wight
Attorneys.

Reissued Sept. 10, 1935

Re. 19,694

UNITED STATES PATENT OFFICE 19,694

HYDRAULIC MOTOR CONTROL MEANS

Walter Ernst, Mount Gilead, Ohio, assignor to The Hydraulic Press Manufacturing Company, Mount Gilead, Ohio Original No. 1,927,583, dated September 19, 1933, Serial No. 482,094, September 15, 1930. Application for reissue October 12, 1934, Serial No. 748,138

38 Claims. (Cl. 60—52)

This invention relates to hydraulic motor control means and more particularly to improvements in control means which are adapted for use in connection with hydraulic motors of various kinds having reciprocating, double-acting work elements, such for example as hydraulic presses.

It is frequently desirable that hydraulic motors of the reciprocating type be provided with control means adapted to so control the flow of pressure fluid to the several pressure chambers of the motor as to cause the work element to perform a complete working stroke, to then be automatically reversed at the end of the working stroke, to then return to its initial or starting position and there be brought to rest. This sequence of movements of the working element constitutes what is known in the art as "semi-automatic" operation and will be hereinafter referred to as such. For a complete understanding of an efficient control mechanism arranged to effect movements of the platen of a hydraulic press in the foregoing sequence, reference may be had to my prior Patent No. 1,711,378, granted April 30, 1929, in which is shown, described and claimed a control mechanism including means responsive to built-up pressure in the pressing cylinder for automatically reversing the direction of platen travel when the platen has completed the pressing operation, and platen actuated means for automatically bringing the platen to rest at the end of each return stroke.

In my Patent No. 1,746,419 granted February 11, 1930 there is shown, described and claimed a control mechanism for hydraulic presses including means responsive to the pressure in the pressing cylinder for automatically reversing the direction of platen travel at the end of each pressing stroke, and platen actuated means for automatically reversing the direction of platen travel at the end of each return stroke, so that the platen automatically performs an indeterminate number of pressing and return strokes. This sequence of movements of the platen or work element constitutes what is known in the art as "completely automatic" operation and will hereinafter be referred to as such.

In some cases hydraulic motors are called upon to perform under either semi-automatic operation or completely automatic operation, depending upon the nature of the particular work to be done, and it is therefore desirable that the means controlling the movements of the work element be adapted for either semi-automatic or completely automatic operation. The control means disclosed in my prior Patent No. 1,746,419 referred to above may be readily arranged for either kind of operation with only a brief suspension of the operation of the press; but experience has demonstrated that it would be to advantage to provide a control means capable of being instantaneously adapted for either semi-automatic or completely automatic operation without any interruption of operation.

It is accordingly an object of the present invention to provide a control means for hydraulic motors of the reciprocating double-acting type, including a single element which is adjustable to adapt the control means to effect either semi-automatic or completely automatic operation of the motor.

Among the objects of the invention are to provide electrical control means capable of being nicely adjusted to effect accurate regulation of the travel of the work element and of the pressure attained during a working stroke, and to provide control means including a single element which is selectively adjustable to adapt said means for automatically reversing the travel of the work element at the end of a working stroke either upon the attainment of a predetermined pressure in the work cylinder, or upon the movable work element's reaching a predetermined position.

In the drawings:

Figure 5 is a detail sectional view of the reversing valve, a piston valve being shown in a different position from that shown in Figure 1;

Figure 6 is a view similar to Figure 5, the piston valve being shown in still another position; and Figure 7 is a diagrammatic showing of an electrical control circuit, and Figure 8 is a view partly in section and partly in elevation of a modification in which a reversible discharge pump is employed.

Figure 1:
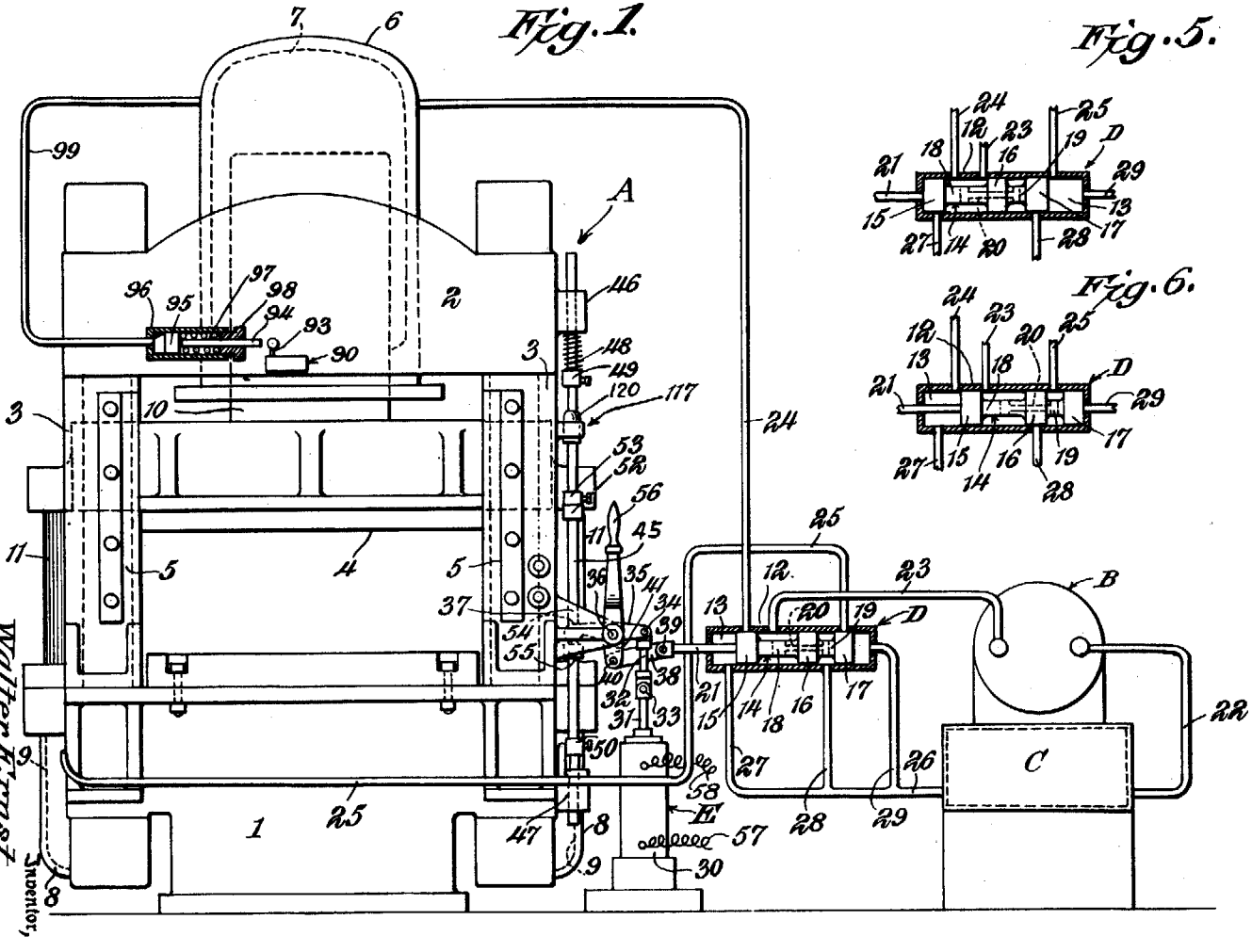
Figure 1 is a view in front elevation of hydraulic motor and control means embodying the invention, a reversing valve being shown in vertical section.
Figures 2, 3, 4:
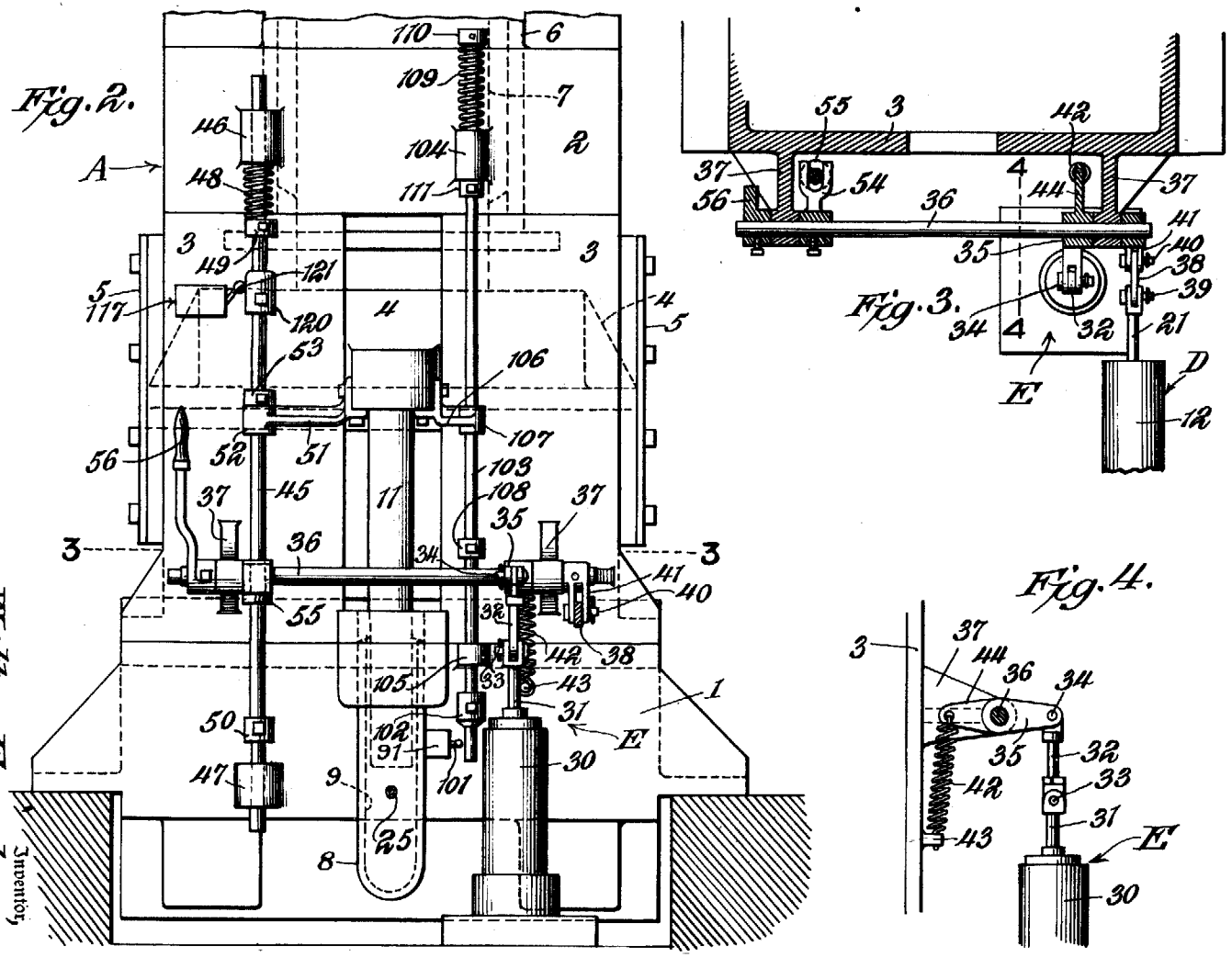
Figure 2 is a fragmentary side elevation of the motor and control means shown in Figure 1.
Figure 3 is a fragmentary horizontal sectional view taken on the line 3—3 of Figure 2.
Figure 4 is a detail vertical sectional view taken on the line 4—4 of Figure 3.

The invention may be embodied in various kinds of hydraulic motors; but for the purposes of illustration is shown as embodied in a hydraulic press A of the downward pressure type having a base 1, a head 2 connected to the base by means of side frame elements 3, and a platen 4 mounted in guides 5 for reciprocatory movements with respect to the base and the head. For reciprocating the platen there are provided cylinder means including a main or pressing cylinder 6 having a work chamber 7 and push-back cylinders 8 having return chambers 9, and ram means connected to the platen and including a pressing ram 10 mounted for reciprocation in the pressing cylinder, and return rams 11 mounted for reciprocation in the push-back cylinders 8.

For supplying fluid under pressure to the work chamber and to the return chamber to reciprocate the platen I provide a pump B, a tank or reservoir C, a reversing valve D, and suitable piping forming with the work and return chambers, the pump, the tank, and the valve, a reversible flow hydraulic circuit.

The valve D includes a casing 12 formed with a valve chamber 13, and a piston valve 14 mounted for sliding movements within the casing. The piston valve comprises spaced heads 15, 16 and 17, a valve stem 18 interposed between and connecting the heads 15 and 16, and a stem 19 interposed between and connecting the heads 16 and 17. A passage 20 formed within the piston valve provides constant communication between the space defined by the valve casing and the heads 15 and 16 and the space defined by the valve casing and the heads 16 and 17. A valve rod 21 extends from the head 15 through the adjacent end of the casing 12 for connection to valve actuating means to be later described.

The piping connecting the reversing valve, the tank and the pump to complete the reversible flow circuit includes a pump intake or suction pipe 22 respectively communicating at its opposite ends with the pump and the tank, a discharge pipe 23 communicating at one end with the pump and at its other end with the valve chamber 13, adjacent to the center thereof, a pipe 24 which connects the work chamber 7 of the main cylinder with the valve chamber at a point between the pipe 23 and the left hand end of the valve as viewed in Figures 1, 5 and 6, a pipe 25 which connects the return chambers 9 of the push-back cylinders with the valve chamber adjacent to the right hand end thereof, an exhaust pipe 26 connected to the tank C and exhaust branches 27, 28 and 29 respectively, communicating with the valve chamber, as shown in Figures 1, 5 and 6.

Thus far only the press and associated hydraulic circuit have been described and no means have been described for actuating the valve D to control the movements of the platen. In order to assist in the understanding of the detailed description of the control means which is to follow, the operation of the press will be briefly set forth without reference to any particular means for shifting the valve.

Assuming that the parts are in the relative positions shown in Figure 1 the pump will receive fluid through the suction pipe 22 and will discharge fluid under pressure through the pipe line 23 into that part of the valve chamber 13 then included between the valve heads 15 and 16. This fluid will then pass through the passage 20 in the piston valve to the space between the valve heads 16 and 17 and thence to tank C by means of the branch exhaust pipe 28 and the exhaust pipe 26, the pump discharge being thus by-passed so as to produce no movement of the press platen. When the piston valve 14 is moved to its extreme left hand position (the position shown in Figure 5), discharge from the pump will flow through the discharge pipe 23 into that part of the valve chamber then included between the heads 15 and 16 and thence through the pipe 24 to the work chamber 7. At this time the return chambers of the push-back cylinders will communicate with the tank C by means of the pipe 25, that part of the valve chamber then included between the head 17 and the right hand end of the valve casing, the exhaust branch 29 and the exhaust pipe 26. Fluid under pressure entering the work chamber will then move the platen downwardly to perform a pressing operation, this downward movement of the platen and consequently of the push-back rams 11 forcing from the return chambers 9 the fluid which remained therein after the termination of the preceding return stroke. When the working stroke has been completed, the valve 14 will be moved to its extreme right hand position (the position shown in Figure 6), at which time the pump will deliver fluid under pressure to the push-back cylinders by means of the discharge line 23, that part of the valve chamber then included between the heads 15 and 16, the passage 20 in the piston valve 14, that part of the valve chamber then included between the heads 16 and 17, and the pipe 25. Fluid under pressure thus delivered to the push-back cylinders will cause the platen to move upwardly which will result in expelling from the work chamber the fluid remaining therein at the completion of the preceding working stroke, this fluid passing back to the tank through the pipe 24, that part of the valve chamber included between the head 15 and left hand end of the valve casing, the exhaust branch 27 and the exhaust pipe 26. When the platen has been thus returned to its uppermost position, the valve 14 may be moved either to its Figure 5 position to start another working stroke, or to its Figure 1 position to bring the platen to rest.

From the foregoing it will be observed that the valve 14 is movable to three positions to respectively direct fluid under pressure to the work chamber 7 to effect a working stroke, or to the return chambers 9 to effect a return stroke, or to cut off fluid flow to both the work and return chambers simultaneously.

Although the invention is illustrated as being embodied in a press and associated hydraulic circuit including a pump of the constant delivery type, and a reversing valve for reversing the direction of fluid travel in the circuit, it is obvious that the invention may also be embodied in hydraulic motors and associated circuits in which the pump is of the rotary, variable stroke, reversible discharge type and in which no separate reversing valve is used. Pumps of this type are well known in the art and in general may be said to include a floating ring adapted to be shifted off center in either of two directions with relation to other elements of the pump to effect discharge of fluid under pressure in either of two directions depending upon the direction in which the floating ring is shifted, or the ring may be moved to a central position relative to the other pump elements to reduce the pump discharge to zero. A pump of this type is fully disclosed in Patent No. 1,250,170 to Hele-Shaw et al., of December 18, 1917, and need not here be further described.

For moving the valve 14 from either its Figure 1 or its Figure 6 position to its Figure 5 position to effect a pressing stroke of the platen, I have provided electrical valve-actuating means generally designated E and comprising a solenoid 30 having a plunger 31 connected to the valve rod 21 through the medium of a link 32 pivoted at its lower end to the plunger 31 as at 33 and pivoted at its upper end as at 34 to a forked crank arm 35 secured to a rock shaft 36 journalled in brackets 37 on the side frame of the press, and a link 38 pivoted at one of its ends as at 39 to the valve rod 21 and pivoted at its other end as at 40 to a forked crank arm 41 also secured to the shaft 36. When the solenoid is energized in a manner to be hereinafter described, the plunger 31 will be drawn downwardly which, through the link 32 and the crank arm 35 will rock the shaft 36 in a clockwise direction. This rocking of the shaft will swing the arm 41 in a clockwise direction and will move the valve rod 21 and the valve 14 to the left to their Figure 5 positions, thus initiating a pressing stroke. It will be observed that the solenoid 30 and valve D together constitute electrically actuated flow-controlling means. Any other suitable form of electrical device having a movable element connected to the valve rod 21 may be used instead of the solenoid 30.

For constantly urging the valve 13 to its extreme right hand or Figure 6 position, there is provided a spring 42 interposed between a lug 43 on the press frame and an arm 44 secured to the shaft 36, this spring tending to rotate the shaft 36 in a counter-clockwise direction, and to move the valve 14 to its Figure 6 position.

In accordance with the invention, control means are provided for either automatically energizing the solenoid when the platen approaches the end of a return stroke or for manually effecting energizing of the solenoid when the platen is at rest in its upper position; and for automatically effecting deenergizing of the solenoid when a predetermined degree of pressure is built up in the work chamber 7 during a pressing stroke, the deenergizing of the solenoid permitting the spring 42 to return the valve to its Figure 6 position to start a return stroke. This control means includes a rod 45 mounted for vertical sliding movements in lugs 46 and 47 on the press head and base respectively, the rod 45 being urged downwardly by means of a spring 48 interposed between the lug 46 and a collar 49 secured to the rod, and being limited in its downward movement by a collar 50 secured to the rod and adapted to engage the lug 47. Mounted on the platen is an arm 51 having at its outer end a boss 52 through which the rod 45 extends and with respect to which the rod is freely slidable. During upward movement of the platen, the boss 52 is adapted to engage a collar 53 secured to the rod in adjusted position. After this engagement of the boss 52 with the collar 53, further movement of the platen will raise the rod, and will move the valve 14 toward its Figure 1 position through medium of a forked arm 54 secured to the shaft 36 and engageable by a collar 55 secured to the rod 45. When the rod is lifted the collar 55 will engage the arm 54 and will rock the latter in a clockwise direction, thus moving the valve 14 from its Figure 6 position to the left. As the platen approaches its uppermost position the valve 14 will, by means of the mechanism just described, be caused to gradually approach its Figure 1 position. During this movement of the valve, the head 16 will gradually uncover the exhaust branch pipe 28 so that the bypass to the tank will be gradually opened. At the same time the head 17 will gradually cover the end of the pipe 25. The return motion of the platen will cease as soon as the throttled exhaust opening between the valve chamber and the exhaust branch 28 is enlarged to such a degree that the pump pressure has dropped to a valve required to balance the weight of the movable press elements. At this time a state of balance will exist in the circuit and the pump will supply fluid at a pressure just sufficient to hold the movable press parts in their upper position against the attraction of gravity. Although when the platen is automatically brought to rest in its upper position, the valve 14 will not be moved all the way to the Figure 6 from the Figure 1 position; it is obvious that in the position to which the valve will be moved in actual practice, flow of fluid under pressure is effectively cut off from both the work and return chambers. A manually operable lever 56 secured to the shaft 36 provides for manual control of the press whenever desired. The control rod 45 and the associated mechanism, it will be noted, constitute ram-arresting means which is operable to bring the ram and platen to rest at the end of the return stroke.

In some cases, where the reversing valve is necessarily heavy because of the high pressures handled, the force required to move the valve may be greater than that available from the solenoid 30 and the spring 42. In such cases the reversing valve may be actuated by means of an auxiliary hydraulic pilot circuit including a "servomotor" for effecting the application of pressure to suitable pistons or plungers for moving the main valve to each of its three positions. Devices of this kind are well known in the art and need not be here further referred to.

As previously stated, the invention may be embodied in hydraulic motors and associated circuits in which the pump is of the rotary, reversible, discharge type in which no separate reversing valve is used. Figure 8 shows a pump B′ of this kind adapted for connection to the hydraulic circuit shown in Figure 1 and adapted to be controlled by the mechanism E. The pump B′ is of a well known type including a casing 56*a* provided with combined inlet and outlet connections 56*b* and 56*c* connected respectively to the pipes 24 and 25, and a shiftable rod or flow controlling element 56*d* pivoted as at 56*e* to the link 38. The arrangement is such that when the rod 56*d* is moved to the right fluid will be delivered under pressure through the pipe 25 to the push-back cylinders 8, and when the rod is moved to the left fluid under pressure will be delivered through the pipe 24 to the pressing cylinder 6. When the rod is in its central or neutral position there will be no delivery of fluid. A compensating valve 56*f* of the kind fully disclosed in the United States patent to Walter Ernst 1,653,350, of December 20, 1927, is connected across the pipes 24 and 25 and has its central chamber 56*g* connected to the tank c by means of a pipe 56*h* for compensating for the unequal effective cross sectional areas of the cylinder 6 and the cylinders 8 in a manner well understood in the art. It will be obvious that the operation of the ram may be controlled by shifting of the pump rod 56*d* in the same way as by shifting the valve 14 of the arrangement shown in Figure 1.

The solenoid 30 is adapted to be connected to a suitable source of electrical power by means of power lines 57 and 58; and a two-pole normally open main switch F which includes switch arms 59 and 60 adapted to be closed upon switch points 61 and 62 to close the circuit through and to energize the solenoid. The arms 59 and 60 of the main switch are fixed to a rotatable shaft 63 urged in the direction of the arrow *x* in Figure 7 by means of a spring 64 connected to an arm 64a on the shaft, the switch arms 59 and 69 being thereby normally maintained out of contact with the points 61 and 62. The shaft 63 is adapted to be rotated in the direction of the arrow y and the main switch consequently adapted to be closed by electric means comprising a pilot electric circuit connected across the lines 57 and 58 and including three parallel circuit branches 65, 66 and 67, a circuit portion 68 common to all of the branches and connecting one end of each to the line 58 and a conductor 69 also common to all of the branches and being adapted to connect one end of each to the line 57.

Interposed in series in the circuit portion 68, which it will be noted, is exterior of all of said branches, is a manually operable cut-out switch 70 and a holding coil 71, the latter when energised being adapted to attract an arm 72 fixed to the shaft 63 as at 73 and to thus rotate the shaft to close the main switch and to energize the solenoid. When the holding coil 71 is energized the arm 72 will be swung in the direction of the arrow y (see Figure 7), at which time a normally open contactor switch G will be closed, the switch G comprising a contactor bridge piece 74 on the lower end of the arm 72 adapted to bridge two contact points 75 and 76, thus connecting the circuit branch 65 with the conductor 69 and completing the pilot circuit through the branch 65. The shaft 63 and the arm 72 are urged to their Figure 7 positions by the spring 64.

The circuit branch 65 includes a conductor 79 connected to the circuit portion 68, a normally closed emergency reverse push-button switch 80, a conductor 81, a conductor 82 connected to the contact point 75, and a double-throw switch 83 having switch arms 84 and 85 adapted to close on a pair of switch points 86 and 87 or upon another pair of switch points 88 and 89. When the switch arms are closed upon the points 86 and 87, the circuit branch 65 will be closed through a normally closed pressure responsive switch 90 connected across the points 86 and 87 of the switch 83; and when the arms of the switch 83 are closed upon the points 88 and 89, the circuit branch 65 will be closed through a normally closed platen operated switch 91 connected across the points 88 and 89 of the switch 83. The switch 90 includes a switch arm 92, spring-urged to its closed position and an operating arm 93 mounted in fixed relation to the switch arm 92. This switch is adapted to be open by means of a rod 94 mounted on a piston 95 arranged for sliding movements in a cylinder 96 mounted on the press head. The piston 95 and the rod 94 are urged to the left as viewed in Figure 1 by means of a spring 97 interposed between the piston and a nut 98 by means of which the compression of spring 97 may be adjusted. The chamber within the cylinder 96 is in constant communication with the work chamber 7 through the medium of a pipe 99 so that the unit pressure within the cylinder 96 will always be equal to that in the work chamber. The compression of the spring 97 is so adjusted that the piston 95 will remain in its extreme left hand position as shown in Figure 1 until a desired predetermined pressure has built up in the work chamber and in the cylinder 96 during a working stroke, at which time the piston 95 and the rod 94 will be moved to the right against the action of the spring 97, the rod 94 at this time engaging the operating arm 93 of the switch 90 and moving it to rock the switch arm 92 in a clockwise direction. Thus, when the double throw switch is closed upon the points 86 and 87 and the switch 90 thereby made part of the circuit branch 65, opening of the switch 90 serves to break the pilot circuit through the circuit branch 65, thereby deenergizing the coil 71 and effecting opening of the main switch to also deenergize the solenoid. This permits the spring 42 to move the valve 14 to its Figure 6 position and to start a return stroke of the platen.

When the arms of the double pole switch 83 are closed upon the points 88 and 89, the circuit branch 65 will be normally closed through the platen-operated switch 91. This switch includes a switch arm 100 spring-urged to closed position and an operating arm 101 mounted in fixed relation to the switch arm. The switch 91 is adapted to be opened when the platen reaches a predetermined position during a pressing stroke by means of a collar 102 fixed to a rod 103 mounted for sliding movements in lugs 104 and 105 on the press head and base respectively and being adapted to be moved downwardly through the medium of an arm 106 carried by the platen and having at its outer end a boss 107 through which the rod extends, and a collar 108 adjustably secured to the rod and adapted to be engaged by the boss 107 and moved downwardly against the urge of a spring 109 interposed between the upper face of the lug 104 and a collar 110 on the rod. A collar 111 is secured to the rod and is engageable with the lower face of the lug 104 for limiting upward movement of the rod under the urge of the spring 109. Thus when the rod is moved downwardly the collar 102 will engage the operating arm 101 of the switch 91 thereby opening the latter, breaking the pilot circuit through the circuit branch 65 and deenergizing the solenoid. As before stated, the deenergizing of the solenoid permits the spring 42 to return the valve 14 to its Figure 6 position to start a return stroke of the platen.

From the foregoing, it will be observed that through the selective setting of the double-throw switch 83 the control means is adapted for reversal of the platen at the end of a pressing stroke either in accordance with the distance travelled by the platen, or the pressure exerted upon the work.

It will be observed that when the holding coil 71 has been once energized and the bridge piece 74 closed upon the contact points 75 and 76 in the manner already described the pilot circuit will be closed through the conductor 69, the circuit branch 65 and the common circuit portion 68, thus maintaining the coil 71 energized and maintaining the bridge piece 74 closed upon the points 75 and 76 until either the switch 80 or one or the other of the switches 90 and 91 is opened.

The circuit branch 66 includes the conductor 79, a normally open manually operable starter switch 112 preferably of the push-button variety, and a conductor 113 connected to the common conductor 69. Assuming that all of the circuit branches are open as shown in Figure 7 and that it is desired to momentarily manually energize the holding coil 71 to close the main switch and to close the bridge piece 74 upon the points 75 and 76, the push-button switch 112 is pressed, thus closing the pilot circuit through the common circuit portion 68, the conductor 79, the switch 112, the conductor 113 and the conductor 69. As soon as the holding coil is thus energized the pilot circuit will be closed through the circuit branch 65 in the manner described above and subsequent opening of the push-button switch 112 will not act to deenergize the holding coil 71 or to open the main switch.

When it is desired that the press operate under completely automatic control, it is necessary that means be provided for automatically effecting a closing of the main switch to energize the solenoid when the platen approaches the end of a return stroke. The circuit branch 67 is adapted to automatically effect closing of the pilot circuit at this time and to this end includes a conductor 114 connected to the common circuit portion 68, a manually operable selector switch 115, a conductor 116, a normally open reversing switch 117 having a switch arm 118 spring-urged to open position, a conductor 119 and the conductor 113. A collar 120 secured to the platen operated rod 45 is adapted when the rod is lifted in the manner already described, to engage an operating arm 121 mounted in fixed relation to the switch arm 118 to move the latter to its closed position, thus completing the control circuit through the circuit branch 67 and energizing the holding coil 71 which as stated above, effects closing of the main switch and energizing of the solenoid. When the platen begins another pressing stroke with the resultant lowering of the rod 45 and opening of the switch 117, the holding coil will maintain the bridge piece 74 closed upon the contact points 75 and 76, thus maintaining the main switch F closed and the solenoid energized until the pressing stroke has been completed and the switch 90 or the switch 91 opened in the manner already described.

It will be noted that through the closing or opening of the manually operable selector switch 115, the closing and opening of the switch 117 in the circuit branch 67 will be rendered effective or ineffective as desired, that is to say, when the switch 115 is closed the closing of the switch 117 will automatically effect energizing of the solenoid when the platen approaches the end of a return stroke, whereas when the switch 115 is open the closing of the switch 117 will be ineffective.

The various electrical devices employed are of well known standard types obtainable from electrical manufacturers, and for this reason, and in the interest of simplicity and clearness of the disclosure, the details thereof have not been illustrated or described.

*Operation*

In order that the invention may be more clearly understood, the operation under both semi-automatic and completely automatic control will be described. It will be assumed that the parts are in the relative positions shown in Figs. 1, 2, 3, 4, and 7 and that the motor or other prime mover driving the pump B is in operation. As hereinbefore stated, with the parts in the positions shown in the figures referred to above, the discharge from the pump will be by-passed to the tank C and no movement of the platen 4 will take place. If it is desired that the press be operated under fully automatic control, it is necessary as a preliminary step to close the manually operable selector switch 115 in the circuit branch 67. Assuming also, it is desired that the platen be reversed when a predetermined pressure has been exerted on the work, irrespective of the distance travelled by the platen, the double pole switch 83 will be closed upon the points 86 and 87 to connect the pressure responsive switch 90 in the circuit branch 65. To initiate pressing movement of the platen the push button starter switch 112 is then momentarily closed. This closes the pilot circuit through the conductor 69, the circuit branch 66 and the circuit portion 68, thus energizing the holding coil 71 which moves the arm 72 to close the normally open switch G and to also close the main switch F. The closing of the switch F energizes the solenoid which acts to draw the plunger 31 down and to move the piston valve 14 to its Fig. 5 position in the manner already described. When the push button starter switch 112 is again allowed to open, the pilot circuit will remain closed through the circuit branch 65 and the solenoid will be maintained energized to retain the valve 14 in its Fig. 5 position against the urge of the spring 42. With the valve in its Fig. 5 position pump discharge is directed to the work chamber of the main cylinder and the platen is moved downwardly to perform a pressing operation. As soon as sufficient resistance is offered by the work to the downward movement of the platen, pressure will build up in the work chamber 7 to a degree sufficient to move the piston 95 and the rod 94 to the right. When so moved the rod 94 will engage the operating arm 93 of the normally closed switch 90 and open the latter, thus breaking the pilot circuit, deenergizing the holding coil 71, opening the switch G and the switch F, and deenergizing the solenoid. The spring 42 will then move the piston valve 14 to its Fig. 6 position through the medium of the arm 44, the rock shaft 36, the arm 41, and the link 38. Pressure fluid will then be directed to the return chambers 9 of the push back cylinders and will move the platen upwardly to perform a return stroke. When the platen approaches the end of the return stroke the boss 52 carried by the platen will engage the collar 53 on the rod 45, thereby lifting the rod and causing the collar 120 to engage and move the operating arm 121 of the normally open switch 117 to close the latter. This closing of the switch 117 will complete the pilot circuit through the common conductor 69, the circuit branch 67 and the common circuit portion 68, and will thereby energize the holding coil 71 which will close the switch G and the main switch F to energize the solenoid. The solenoid, having thus been energized, another pressing stroke will begin and an indeterminate number of complete cycles of operations will take place in the manner already described. It will be noted that when the platen begins another pressing stroke and the rod 45 is lowered the switch 117 will be opened, thus breaking the circuit through the branch 67. However, the pilot circuit will still be closed through the circuit branch 65 so that the solenoid will be maintained energized in the same manner as when the pilot circuit was initially closed through the branch 66 when the press was first started. It will further be observed that if it so happens that the platen was in its uppermost position before operation was started the switch 117 would have been at that time closed. Therefore, the closing of the switch 115 will complete the pilot circuit through the branch 67 and will energize the solenoid to start the operation without its being necessary to first momentarily close the switch 112.

If it is desired that the press operate under semi-automatic control the selector switch 115 is opened. The operation will then be started by closing the starter switch 112 in the circuit branch 66 in the manner already described in connection with the completely automatic operation. The platen will then perform a pressing stroke and will start a return stroke in the same manner as in completely automatic operation. However, when the platen approaches the end of the return stroke and the switch 117 is closed through the raising of the rod 45, no closing of the pilot circuit will be effected since the previous opening of the selector switch 115 has rendered the closing of the switch 117 ineffective. The platen will therefore continue to move upwardly until the collar 55 on the rod 45 engages the forked lever 54 and rocks the shaft 36 in a clockwise direction sufficiently to move the piston valve 14 to its Figure 1 position or approximately to this position. In other words, as before stated, the valve 14 will be moved to the left until the head 16 uncovers the exhaust branch 28 to such an extent, and the throttled exhaust opening between the valve chamber and the exhaust branch 28 is enlarged to such a degree that the pump pressure drops to the value required to balance the weight of the movable press elements. A state of balance will then exist in the circuit and the pump will supply fluid at a pressure just sufficient to hold the movable press parts in their upper position. In order to cause the platen to perform another pressing and return stroke the starter switch 112 is again momentarily depressed after which the same sequence of movements of the platen will take place and the platen will again be brought to rest in its uppermost position.

If it be desired that, during either automatic or semi-automatic operation, the platen be reversed when a predetermined position has been reached during a pressing stroke, irrespective of the pressure exerted upon the work, the double pole switch 83 will be closed upon the contact points 88 and 89 to connect the platen operated switch 91 in the circuit branch 65. Then, regardless of whether the press is arranged for automatic or for semi-automatic control, the opening of the switch 91 caused by the downward movement of the rod 103 effected by engagement of the boss 107 on the platen with the collar 108 on the rod will open the pilot circuit through the circuit branch 65, deenergize the solenoid and permit the spring 42 to return the valve 14 to its Fig. 6 position.

If it is desired to reverse the direction of travel of the platen at any time when it is performing a pressing stroke, whether under semi-automatic or completely automatic operation, such reversal may be accomplished by opening the manually operable emergency reverse switch 80. This will break the pilot circuit through the branch 65 whereby the holding coil 71 will be deenergized and the switches G and F will be opened, thus deenergizing the solenoid and permitting the spring 42 to move the valve to its Fig. 6 position, whereupon the platen will immediately approach its upper position and after reaching this position will either start downward on another pressing stroke or be brought to rest, depending upon whether the pilot circuit is adapted for fully automatic or semi-automatic control.

If the press be operating under fully automatic control and an emergency arises which is such that the platen should be prevented from starting downward from its uppermost position, the pilot circuit may be rendered inoperative by opening the cut-out switch 70. As long as this switch is open it will be impossible to start the press again by means of the electrically actuated means, although any desired movements of the platen may be effected at any time by means of the manually operable lever 56.

It will be observed that by closing or opening the selector switch 115 the closing of the platen operated switch 117 may be rendered effective or ineffective and that the switch 115 therefore constitutes a single control element, the selective setting of which adapts the press for either fully automatic or semi-automatic operation as desired.

By means of my improved control apparatus, accurate regulation of the extent of platen travel and of the working pressures exerted is attainable. Because of the simplicity of the push-button control employed, less effort on the part of the operator is required than when using heretofore known control means. These and other advantages result from the fact that the electrical devices used are freely moving and work without appreciable mechanical friction, being consequently very sensitive. The changes of fluid flow are effected virtually instantaneously; and quick and positive control of the movements of the work element is thus effected. Furthermore, the motor may be instantaneously adapted for either semi-automatic or completely automatic operation by the selective setting of a single electric switch.

I claim:

1. The combination with a hydraulic motor including reciprocable ram means; of means forming a hydraulic circuit with said motor for operating said ram means in both directions; and control means associated with said circuit for controlling the flow of fluid therein to effect either completely or semi-automatic operation of said ram means, said control means including means for automatically reversing said ram means when a working stroke has been completed, electrical means responsive to travel of the ram means for automatically reversing the latter at the end of a return stroke, means responsive to travel of the ram means for automatically bringing the ram means to rest at the end of a return stroke when said electrical means are inactive, and means for selectively rendering said electrical means active or inactive.

2. The combination with a hydraulic motor including cylinder means having a work chamber and return chamber, and ram means mounted for reciprocatory movements in said cylinder means; of a pump; means forming with said pump and said chambers a hydraulic circuit; valve means in said circuit movable to three positions to respectively direct fluid from said pump to said work chamber, or to said return chamber, or to cut off fluid flow to both chambers simultaneously; means for automatically moving said valve means from its first position to its second position at the end of a working stroke to start a return stroke; electrical means adapted when active to automatically move said valve means from its second to its first position at the end of a return stroke to start another working stroke; an electric switch operable by said ram means at the end of a return stroke to close an electric circuit through said electrical means; independent means operable by said ram means at the end of a return stroke and effective when said electrical means is inactive to automatically move said valve means from its second to its third position to thereby bring said ram means to rest; and manually operable electric switch connected in the circuit with said ram-operated switch and adapted to render the operation of the latter effective or ineffective, said manually operable switch thus constituting a single control element the selective setting of which adapts said motor for either completely or semi-automatic operation as desired.

3. The combination with a hydraulic motor including a cylinder means having a work chamber and a return chamber, and ram means mounted for reciprocatory movements in said cylinder means; of a pump; means forming with said pump and said chambers a hydraulic circuit; valve means in said circuit movable to three positions to respectively direct fluid from said pump to said work chamber, or to said return chamber, or to cut off fluid flow to both chambers simultaneously; means for automatically moving said valve means from its first to its second position at the end of a working stroke to start a return stroke; electrically actuated means adapted when active to automatically move said valve means from its second to its first position at the end of a return stroke to start another working stroke; independent means effective when said electrically actuated means is inactive to automatically move said valve means from its second to its third position at the end of a return stroke to bring said ram means to rest; and a manually operable electric switch adapted to render said electrically actuated means active during a return stroke to effect completely automatic operation of said motor, or to render said means inactive during a return stroke to effect semi-automatic operation thereof.

4. The combination with a hydraulic motor including cylinder means having a work chamber and a return chamber, and ram means mounted for reciprocatory movements in said cylinder means; of a pump; means forming with said pump and said chambers a hydraulic circuit; valve means in said circuit movable to three positions to respectively direct fluid from said pump to said work chamber, or to said return chamber, or to cut off fluid flow to both chambers simultaneously; means responsive to attainment of a predetermined pressure in said work chamber during a working stroke for automatically moving said valve means from its first to its second position to start a return stroke; electrically actuated means adapted when active to automatically move said valve means from its second to its first position at the end of a return stroke to start another working stroke; independent means operable by said ram means when the latter approaches the end of a return stroke and effective when said electrically actuated means is inactive to automatically move said valve means from its second to its third position to bring said ram means to rest; and a manually operable electric switch adapted to render said electrically actuated means active during a return stroke to effect completely automatic operation of said motor, or to render said means inactive during a return stroke to effect semi-automatic operation thereof.

5. The combination with a hydraulic motor including cylinder means having a work chamber and a return chamber, and ram means mounted for reciprocatory movements in said cylinder means; of a pump; means forming with said pump and said chambers a hydraulic circuit for delivering fluid under pressure to both of said chambers; electrically actuated flow-controlling means in said circuit for effecting delivery of fluid under pressure to said chambers separately; an electric switch adapted when closed to effect actuation of said flow controlling means; and means associated with said switch and being responsive to a change in pressure in one of said chambers for operating said switch, the pressure-operated means being connected to an auxiliary circuit having a holding means for retaining said switch in one of its positions.

6. The combination with a hydraulic motor including cylinder means having a work chamber and a return chamber, and ram means mounted for reciprocatory movements in said cylinder means; of a pump; means forming with said pump and said chambers a hydraulic circuit for delivering fluid under pressure to both of said chambers; flow controlling means in said circuit movable to two positions to direct fluid from said pump to said work chamber and to said return chamber respectively; electrical actuating means associated with said flow-controlling means and adapted when active to move the latter to one of said positions; an electric switch having electrical connection with said actuating means; means associated with said switch and being responsive to the pressure in one of said chambers for operating said switch to render said electrical actuating means inactive; and means for then moving said flow controlling means to its other position, the pressure-operated means being connected to an auxiliary circuit having a holding means for retaining said switch in one of its positions.

7. The combination with a hydraulic motor including cylinder means having a work chamber and a return chamber, and ram means mounted for reciprocatory movements in said cylinder means; of a pump; means forming with said pump and said chambers a hydraulic circuit for delivering fluid under pressure to both of said chambers; flow controlling means in said circuit movable to two positions to direct fluid under pressure to said work chamber and to said return chamber respectively to effect working and return strokes of said ram means; electrical actuating means connected to said flow controlling means and adapted when active to move the latter to its first position; and switch means for closing and opening an electric circuit through said actuating means, said switch means being operable by said ram means when the latter approaches the end of a return stroke for rendering active said electrical actuating means, and being responsive to pressure in said work chamber when the ram means is performing a working stroke for rendering said actuating means inactive, the pressure-operated means being connected to an auxiliary circuit having a holding means for retaining said switch means in one of its positions.

8. The combination with a hydraulic motor including cylinder means having a work chamber and a return chamber, and ram means mounted for reciprocatory movements in said cylinder means; of a pump; means forming with said pump and said chambers a hydraulic circuit for delivering fluid under pressure to both of said chambers; flow controlling means in said circuit movable to two positions to direct fluid under pressure to said work chambers and to said return chamber respectively to effect working and return strokes of said ram means; electrical actuating means connected to said flow controlling means and adapted when active to move the latter to its first position; switch means for closing and opening an electric circuit through said actuating means, said switch means being operable by said ram means when the latter approaches the end of a return stroke for rendering active said electrical actuating means, and being responsive to pressure in said work chamber when the ram means is performing a working stroke for rendering said actuating means inactive; and means for then moving said flow controlling means to its second position, the pressure-operated means being connected to an auxiliary circuit having a holding means for retaining said switch means in one of its positions.

9. The combination with a hydraulic motor including cylinder means having a work chamber and a return chamber, and ram means mounted for reciprocatory movements in said cylinder means; of a pump; means forming with said pump and said chambers a hydraulic circuit for delivering fluid under pressure to both of said chambers; a valve in said circuit movable to two positions to direct fluid from said pump to said work chamber and to said return chamber respectively to effect working and return strokes of said ram means; an electrical device having a movable element connected to said valve and adapted when said device is energized, to move said valve to its first position; switch means for controlling the closing and opening of an electric circuit through said device, said switch means being operable by said ram means, when the latter approaches the end of a return stroke for closing said electric circuit to energize said device, and being responsive to an increase in pressure in said work chamber when the ram means is performing a working stroke for opening said electric circuit to deenergize said device, and a spring connected to said valve and urging the latter to its second position, the pressure-operated means being connected to an auxiliary circuit having a holding means for retaining said switch means in one of its positions.

10. The combination with a hydraulic motor including cylinder means having a work chamber and a return chamber, and ram means mounted for reciprocatory movements in said cylinder means; of a pump; means forming with said pump and said chambers a hydraulic circuit; flow-controlling means in said circuit movable to three positions to respectively direct fluid from said pump to said work chamber, and to said return chamber, and to cut off fluid flow to both chambers simultaneously; electrical actuating means connected to said flow-controlling means and adapted when active to move the latter to its first position; means for urging said flow-controlling means to its second position; means operable by said ram means when the latter approaches the end of a return stroke to move said flow-controlling means to its third position; and switch means for closing and opening an electric circuit through said actuating means, said switch means being manually operable to close said electric circuit to render said actuating means active and being responsive to built-up pressure in said work chamber for opening said circuit to render said actuating means inactive.

11. The combination with a hydraulic motor including cylinder means having a work chamber and a return chamber, and ram means mounted for reciprocatory movements in said cylinder means; of a pump; means forming with said pump and said chambers a hydraulic circuit; a valve in said circuit movable to three positions to respectively direct fluid from said pump to said work chamber, and to said return chamber, and to cut off fluid flow to both chambers simultaneously; an electrical device having a movable element connected to said valve and adapted when said device is energized to move the valve to its first position; a spring connected to said valve and urging the latter to its second position; means operable by said ram means when the latter approaches the end of a return stroke to move said valve to its third position; means for closing and opening an electric circuit through said device including a normally open switch adapted to be manually closed to close said electric circuit and energize said device; and a normally closed switch adapted to open said electric circuit and deenergize said device; and means responsive to a change in pressure in said work chamber for opening said normally closed switch.

12. The combination with a hydraulic motor including cylinder means having a work chamber and a return chamber, and ram means mounted for reciprocatory movements in said cylinder means; of a pump; means forming with said pump and said chambers a hydraulic circuit; electrically actuated flow-controlling means in said circuit for reversing the direction of flow therein; a main switch adapted to close an electric circuit through said flow-controlling means to effect a reversal of fluid flow; a pilot electric circuit including two parallel circuit branches; a normally open switch in the first branch adapted to be manually closed to close said pilot circuit; a normally open switch in the second branch; a holding coil in said pilot circuit exterior of said branches and adapted when energized to close the normally open switch in said second branch and to close said main switch; a normally closed switch in said second branch; and means associated with said last named switch and responsive to a change in pressure in said work chamber for opening said switch.

13. The combination with a hydraulic motor including cylinder means having a work chamber and a return chamber, and ram means mounted for reciprocatory movements in said cylinder means; of a pump; means forming with said pump and said chambers a hydraulic circuit; electrically actuated flow-controlling means in said circuit for reversing the direction of flow therein; a main switch adapted to close an electric circuit through said flow-controlling means for actuating the latter; a pilot electric circuit including two parallel circuit branches; a normally open manually operable starter switch in the first branch adapted to close said pilot circuit; a normally open switch in the second branch; a holding coil in said pilot circuit exterior of said branches and adapted when energized to close the normally open switch in said second branch and to close said main switch; a normally closed switch in said second branch adapted to be opened when pressure in said work chamber has built up to a predetermined value; and a normally closed manually operable emergency reverse switch in said second branch for opening said pilot circuit and thereby effecting opening of said main switch at any desired time when said pilot circuit is otherwise closed through said second branch.

14. The combination with a hydraulic motor including cylinder means having a work chamber and a return chamber, and ram means mounted for reciprocatory movements in said cylinder means; of a pump; means forming with said pump and said chambers a hydraulic circuit; a valve in said circuit movable to two positions to respectively direct fluid from said pump to said work chamber, and to said return chamber; an electrical device having a movable element connected to said valve and adapted when said device is energized to move the valve to its first position; a spring for urging the valve to its second position; a main switch adapted to close an electric circuit through said device; a pilot electric circuit including two parallel circuit branches; a normally open manually operable starter switch in the first branch adapted to momentarily close said pilot circuit; a normally open switch in the second branch; a holding coil in said pilot circuit exterior of said branches and adapted when the pilot circuit is closed through the first branch to close the normally open switch in said second branch and to close said main switch to thereby energize said electrical device; and a normally closed switch in said second branch adapted to be opened when the pressure in said work chamber has built up to a predetermined value to thereby open the pilot circuit and deenergize said device to permit said spring to move said valve to its second position.

15. The combination with a hydraulic motor including cylinder means having a work chamber and a return chamber, and ram means mounted for reciprocatory movements in said cylinder means; of a pump; means forming with said pump and said chambers a hydraulic circuit; a valve in said circuit movable to two positions to respectively direct fluid from said pump to said work chamber and to said return chamber; an electrical device having a movable element adapted when said device is energized to move said valve to its first position; a spring for urging said valve to its second position; a main switch adapted to close an electric circuit through said device; a pilot electric circuit including two parallel circuit branches; a normally open switch in the first branch; means operable by said ram means when the latter approaches the end of a return stroke for temporarily closing said switch to close said pilot circuit; a normally open switch in the second branch; means in said pilot circuit exterior of said branches and adapted when the pilot circuit is closed through said first branch to close the normally open switch in said second branch and to close said main switch to energize said electrical device; and a normally closed switch in said second branch adapted to be opened when the pressure in said work chamber has built up to a predetermined value to thereby open the pilot circuit and deenergize said device to permit said spring to move said valve to its second position.

16. The combination with a hydraulic motor including cylinder means having a work chamber and a return chamber, and ram means mounted for reciprocatory movements in said cylinder means; of a pump; means forming with said pump and said chambers a hydraulic circuit; a valve in said circuit movable to two positions to respectively direct fluid from said pump to said work chamber and to said return chamber; an electrical device having a movable element adapted when said device is energized to move said valve to its first position; a spring for urging said valve to its second position; a main switch adapted to close an electric circuit through said device; a pilot electric circuit including two parallel circuit branches; a normally open switch in the first branch; means operable by said ram means when the latter approaches the end of a return stroke for temporarily closing said switch to close said pilot circuit, a normally open switch in the second branch; means in said pilot circuit exterior of said branches and adapted when the pilot circuit is closed through said first branch to close the normally open switch in said second branch and to close said main switch to energize said electrical device; a normally closed switch in said second branch; and adjustable means associated with said normally closed switch and responsive to building up of pressure in said work cylinder to a selected predetermined value for opening said switch to thereby open the pilot circuit and said main switch to deenergize said electrical device and to permit said spring to move said valve to its second position.

17. The combination with a hydraulic motor including cylinder means having a work chamber and a return chamber, and ram means mounted for reciprocatory movements in said cylinder means; of a pump; means forming with said pump and said chambers a hydraulic circuit; a valve in said circuit movable to three positions to respectively direct fluid from said pump to said work chamber, and to said return chamber, and to cut off fluid flow to both of said chambers simultaneously; an electrical device having a movable element connected to said valve and adapted when said device is energized to move the valve to its first position; means for urging the valve to its second position; a main switch adapted to close an electric circuit through said device; a pilot electric circuit including three parallel circuit branches; a normally open, manually operable starter switch in the first branch adapted to momentarily close said pilot circuit; a normally open switch in the second branch; means in said pilot circuit exterior of said branches and adapted when the pilot circuit is closed to close the normally open switch in said second branch and to close said main switch to energize said electrical device and start a working stroke; a normally closed switch in said second branch adapted to automatically open the pilot circuit during a working stroke to deenergize said device to thereby effect the start of a return stroke; a normally open switch in the third branch of said pilot circuit; ram actuated means for closing said last named switch when the ram means approaches the end of a return stroke to close said pilot circuit for automatically effecting the start of another working stroke; and a manually operable switch in said third branch adapted when open to render ineffective the closing of the normally open switch in said third branch, and other ram actuated means effective when the closing of said normally open switch is thus rendered ineffective for moving said valve to its third position to bring said ram means to rest when the latter approaches the end of a return stroke.

18. The combination with a hydraulic motor including reciprocable ram means; of means forming a hydraulic circuit with said motor for operating said ram means; electrically actuated flow-controlling means associated with said circuit for reversing the direction of fluid travel; a ram-operated switch adapted to be connected in circuit with said electrically actuated flow-controlling means and adapted to be operated when the ram means reaches a predetermined position during a working stroke to open the circuit through said flow-controlling means; a pressure responsive electric switch also adapted to be connected in circuit with said electrically actuated flow controlling means and adapted to be operated when a predetermined pressure has been exerted by said ram means during a working stroke; and a manually operable electric switch associated with said ram operated switch and with said pressure responsive switch for selectively connecting either the ram-operated or the pressure responsive switch in circuit with said flow controlling means.

19. The combination with a hydraulic motor for presses or the like including reciprocable ram means; of means forming a hydraulic circuit with said motor for operating said ram means in both directions; and control means associated with said circuit for controlling the direction of flow therein and including means for effecting automatic reversal of said ram means at the end of a pressing stroke, means including an electric switch automatically operable to effect a reversal of movement of said ram means at the end of a return stroke means operable by said ram means when the latter approaches the end of said return stroke for bringing said ram means to rest; and a manually operable electric selector switch in circuit with said automatically operable switch, and being movable to two positions to selectively adapt said control means for completely or for semi-automatic operation of said ram means.

20. The combination with a hydraulic motor including reciprocable ram means; of means forming a hydraulic circuit with said motor for operating said ram means in both directions; and control means associated with said circuit for controlling the direction of flow therein and including electric switch means for automatically effecting reversal of flow of fluid at the end of a working stroke, fluid pressure responsive means for operating said switch means; means responsive to ram travel and independent of pressure for operating said switch means; and means for selectively rendering either one of said switch-operating means effective, whereby said ram means may be automatically reversed upon reaching a predetermined position during a working stroke or upon the building up of a predetermined pressure.

21. The combination with a hydraulic motor including reciprocable ram means; of means forming a hydraulic circuit with said motor for operating said ram means in both directions; and control means associated with said circuit for controlling the direction of flow therein and including a pressure responsive electric switch for automatically effecting reversal of flow of fluid upon building up of a predetermined pressure during a working stroke, other means for automatically effecting reversal of flow of fluid when the ram means reaches a predetermined position during a working stroke; and means for selectively rendering either one of said last two elements singly effective whereby said ram means may be automatically reversed upon building up of a predetermined pressure during a working stroke or upon reaching a predetermined position during a working stroke.

22. The combination of a hydraulic motor including a reciprocable ram; of means for supplying fluid under pressure to the press for operating said ram; and control means associated with said press and circuit including means for controlling the flow of fluid to said ram, pressure responsive means for automatically effecting discontinuance of flow to said ram upon building up of a predetermined pressure on said ram, position controlled means for automatically effecting discontinuance of flow to said ram upon the latter's reaching a predetermined position during a stroke, and means for selectively rendering one only of said last two elements effective whereby the ram stroke may be automatically discontinued upon building up of a predetermined pressure during a stroke or upon the ram's reaching a predetermined position during a stroke.

23. The combination of a hydraulic motor including a reciprocable ram; of means for supplying fluid under pressure to the press for operating said ram; and control means associated with said press and circuit including means for controlling the flow of fluid to said ram, a pressure responsive electric switch for automatically effecting discontinuance of flow to said ram upon building up of a predetermined pressure on said ram, other means for automatically effecting discontinuance of flow to said ram upon the latter's reaching a predetermined position during a stroke, and means for selectively rendering either one of said last two elements effective whereby the ram stroke may be automatically discontinued upon building up of a predetermined pressure during a stroke or upon the ram's reaching a predetermined position during a stroke.

24. The combination with a hydraulic press including cylinder means having a work chamber and a return chamber, and ram means mounted for reciprocatory movements in said cylinder means; of a pump; hydraulic connections between said pump and both of said chambers; flow controlling means for effecting delivery of fluid under pressure separately to both chambers and for discontinuing delivery to both chambers simultaneously; an electric switch adapted when operated to effect actuation of said flow controlling means; means associated with said switch and being responsive to the building up of a maximum predetermined pressure in said work chamber at the end of a working stroke of said ram means for operating said switch to effect actuation of said flow controlling means and delivery of fluid under pressure to said return chamber; and means for actuating said flow controlling means when said ram means reaches the end of a return stroke for discontinuing delivery of fluid to both chambers simultaneously to thereby bring said ram means to rest.

25. The combination with a hydraulic press including cylinder means having a work chamber and a return chamber, and ram means mounted for reciprocatory movements in said cylinder means; of a pump; hydraulic connections between said pump and both of said chambers; flow controlling means for effecting delivery of fluid under pressure separately to both chambers and for discontinuing delivery to both chambers simultaneously; an electric switch adapted when operated to effect actuation of said flow controlling means; means associated with said switch and being responsive to the building up of a maximum predetermined pressure in said work chamber at the end of a working stroke of said ram means for operating said switch to effect actuation of said flow controlling means and delivery of fluid under pressure to said return chamber; and means connected to said flow controlling means and being adapted to be engaged by said ram means when the latter approaches the end of a return stroke for actuating said flow controlling means for discontinuing delivery of fluid under pressure to both chambers simultaneously to thereby bring said ram means to rest.

26. The combination with a hydraulic press including cylinder means having a work chamber and a return chamber, and ram means mounted for reciprocatory movements in said cylinder means; of a pump; hydraulic connections between said pump and both of said chambers; flow controlling means for effecting delivery of fluid under pressure separately to both chambers and for discontinuing delivery to both chambers simultaneously; an electric switch adapted when operated to effect actuation of said flow controlling means; means separate from said flow controlling means and associated with said switch and being responsive to the building up of a maximum predetermined pressure in said work chamber at the end of a working stroke of said ram means for operating said switch independently of operation of said flow controlling means to effect actuation of the latter and delivery of fluid under pressure to said return chamber; and means for actuating said flow controlling means when said ram means reaches the end of a return stroke for discontinuing delivery of fluid to both chambers simultaneously to thereby bring said ram means to rest.

27. The combination with a hydraulic motor having reciprocable ram means; of means forming a hydraulic circuit with said motor for operating said ram means in both directions; and control means associated with said circuit for controlling the flow of fluid therein to effect semi-automatic operation of said ram means, said control means including electrically-operated pressure-responsive means for automatically reversing said ram means when a working stroke has been completed, and means responsive to travel of the ram means for automatically bringing the ram means to rest at the end of a return stroke.

28. The combination with a hydraulic motor having reciprocable ram means; of means forming a hydraulic circuit with said motor for operating said ram means in both directions; and control means associated with said circuit for controlling the flow of fluid therein to effect semi-automatic operation of said ram means, said control means including electrically-operated pressure-responsive means and electrically-operated position-responsive means selectively actuated for automatically reversing said ram means when a working stroke has been completed, and means responsive to travel of the ram means for automatically bringing the ram means to rest at the end of a return stroke.

29. The combination with a hydraulic motor having reciprocable ram means; of means forming a hydraulic circuit with said motor for operating said ram means in both directions; and control means associated with said circuit for controlling the flow of fluid therein to effect semi-automatic operation of said ram means, said control means including electrically-operated pressure-responsive means for automatically reversing said ram means upon the attainment of a predetermined pressure during the working stroke, and means for automatically bringing the ram means to rest at the end of a return stroke.

30. The combination with a hydraulic motor having reciprocable ram means; of means forming a hydraulic circuit with said motor for operating said ram means in both directions; and control means associated with said circuit for controlling the flow of fluid therein to effect semi-automatic operation of said ram means, said control means including electrically-operated pressure-responsive means for automatically reversing said ram means upon the attainment of a predetermined pressure during the working stroke, and means responsive to travel of the ram means for automatically bringing the ram means to rest at the end of a return stroke.

31. The combination with a hydraulic motor including a reciprocable ram; of means for supplying fluid under pressure to the motor for operating said ram; and control means associated with said motor including means for controlling the flow of fluid to said ram, electrically-actuated pressure-responsive means for automatically effecting reversal of flow to said ram upon the building up of a predetermined pressure on said ram, and position-controlled means for automatically effecting discontinuance of flow to said ram upon the latter's reaching a predetermined positioning during the return stroke thereof.

32. The combination with a hydraulic press including a cylinder means having a work chamber and a return chamber, and ram means mounted for reciprocatory movements in said cylinder means; of a pump; flow-controlling means for effecting delivery of fluid under pressure selectively to either chamber; a pressure-responsive electric switch adapted to be actuated upon the attainment of a maximum predetermined pressure in said work chamber; and devices adapted to be operated by the actuation of said switch for diverting said delivery of fluid under pressure from said working chamber to said return chamber.

33. The combination with a hydraulic press including a cylinder means having a work chamber and a return chamber, and ram means mounted for reciprocatory movements in said cylinder means; of a pump, flow-controlling means for effecting delivery of fluid under pressure selectively to either chamber; a pressure-responsive electric switch adapted to be actuated upon the attainment of a maximum predetermined pressure in said work chamber; devices adapted to be operated by the actuation of said switch for diverting said delivery of fluid under pressure from said working chamber to said return chamber; a position-responsive mechanical means adapted to be actuated by the travel of said ram means to a predetermined position; and devices adapted to be operated by the actuation of said last-mentioned mechanical means for cutting off the delivery of fluid to said return chamber.

34. The combination with a hydraulic motor having reciprocable ram means; of means forming a hydraulic circuit with said motor for operating said ram means in both directions, and control means associated with said circuit for controlling the flow of fluid therein to effect completely automatic operation of said ram means, said control means including a pressure-responsive switch and electrical devices controlled thereby for automatically reversing said ram means upon the attainment of a predetermined pressure during the working stroke, and position-responsive means for automatically reversing said ram means upon its reaching a predetermined position during the return stroke.

35. The combination with a hydraulic motor having reciprocable ram means; of means forming a hydraulic circuit with said motor for operating said ram means in both directions, and control means associated with said circuit for controlling the flow of fluid therein to effect completely automatic operation of said ram means, said control means including electrically-operated pressure-responsive means for automatically reversing said ram means upon the attainment of a predetermined pressure during the working stroke, and position-responsive means for automatically reversing said ram means upon its reaching a predetermined position during the return stroke.

36. The combination with a hydraulic motor having reciprocable ram means; of means forming a hydraulic circuit with said motor for operating said ram means in both directions, and control means associated with said circuit for controlling the flow of fluid therein to effect completely automatic operation of said ram means, said control means including electrically-operated pressure-responsive means for automatically reversing said ram means upon the attainment of a predetermined pressure during the working stroke, and electrically-operated position-responsive means for automatically reversing said ram means upon its reaching a predetermined position during the return stroke.

37. The combination with a hydraulic motor including a reciprocable ram; of means for supplying fluid under pressure to the motor for operating said ram; and control means associated with said motor including means for controlling the flow of fluid to said ram; electrically-actuated pressure-responsive means for automatically effecting reversal of flow to said ram upon the building up of a predetermined pressure on said ram during the working stroke thereof, and position-controlled means for automatically effecting a reversal of flow to said ram upon the latter's reaching a predetermined position during the return stroke thereof.

38. The combination with a hydraulic motor including a reciprocable ram; of means for supplying fluid under pressure to the motor for operating said ram; and control means associated with said motor including means for controlling the flow of fluid to said ram; electrically-actuated pressure-responsive means for automatically effecting reversal of flow to said ram upon the building up of a predetermined pressure on said ram during the working stroke thereof, and electrically-actuated position-controlled means for automatically effecting reversal of flow to said ram upon the latter's reaching a predetermined position during the return stroke thereof.

WALTER ERNST.